(12) United States Patent
Dykstra et al.

(10) Patent No.: US 6,239,709 B1
(45) Date of Patent: May 29, 2001

(54) LIQUID LEVEL SENSOR FOR INTERNAL COMBUSTION ENGINE

(75) Inventors: Richard Dykstra, Cedar Grove; Robert K. Mitchell, Brookfield, both of WI (US)

(73) Assignee: Briggs & Stratton Corporation, Milwaukee, WI (US)

( * ) Notice: Subject to any disclaimer, the term of this patent is extended or adjusted under 35 U.S.C. 154(b) by 0 days.

(21) Appl. No.: 09/502,631

(22) Filed: Feb. 11, 2000

Related U.S. Application Data

(63) Continuation-in-part of application No. 09/252,511, filed on Feb. 18, 1999, now abandoned.

(51) Int. Cl.[7] .................................................. G08B 21/00
(52) U.S. Cl. ........................ 340/618; 340/620; 340/450; 340/450.3; 73/290 R; 73/291; 73/304 R
(58) Field of Search ..................................... 340/618, 450, 340/450.3, 620; 73/290 R, 291, 304 R

(56) References Cited

U.S. PATENT DOCUMENTS

| | | |
|---|---|---|
| 3,058,345 | 10/1962 | Mastras . |
| 3,145,567 | 8/1964 | Bobrowsky . |
| 3,326,043 | 6/1967 | Roeske et al. . |
| 3,896,671 | 7/1975 | Marinaccio . |
| 3,916,926 | 11/1975 | Smolin et al. . |
| 3,969,941 | 7/1976 | Rapp . |
| 4,125,021 | 11/1978 | Kamei et al. . |
| 4,135,548 | 1/1979 | Sears . |
| 4,413,255 | 11/1983 | Cohen et al. . |
| 4,476,714 | 10/1984 | Barry et al. . |
| 4,491,103 | 1/1985 | Deadman . |
| 4,506,258 | 3/1985 | Charboneau et al. . |
| 4,564,834 | 1/1986 | Steele . |
| 4,654,646 | 3/1987 | Charboneau . |
| 4,706,497 | 11/1987 | Regan . |
| 4,720,997 | 1/1988 | Doak et al. . |
| 4,799,047 | 1/1989 | Saitoh . |
| 4,912,407 | 3/1990 | Gualtieri et al. . |
| 4,988,975 | 1/1991 | Nap . |
| 5,142,909 | 9/1992 | Baughman . |
| 5,146,271 | 9/1992 | Hoover . |
| 5,205,172 | 4/1993 | Doak . |
| 5,550,478 | 8/1996 | Kopera . |
| 5,578,994 | * 11/1996 | Cherek et al. ......................... 340/618 |
| 5,832,772 | * 11/1998 | McEwan ............................. 73/290 R |

OTHER PUBLICATIONS

IBM Technical Disclosure Bulletin, "Liquid Level Sensor Component," p. 2870, vol. 17, No. 10, Mar. 1975.
Electronics Industry, "Liquid level sensing using thermistors," pp. 37, 39, Mar. 1980.
Electronics, "Thermistor probe helps regulate liquid level" and "Octal register links dissimilar a–d converters," pp. 77, 79, Dec. 1982.
Radio Electronics, "All About Making Measurements Electronically," 75–79, 99, May 1984.
Journal of Electrical Engineering, "Thermistor Characteristics Lead to Widespread Use in Many Fields," pp. 22–23, Aug. 1993.
Journal of Electrical Engineering, PTC, NTC Thermistors Grow with Electric, Electronic Equipment Makers, pp. 16–18, Aug. 1995.

* cited by examiner

*Primary Examiner*—Julie Lieu
(74) *Attorney, Agent, or Firm*—Michael Best & Friedrich LLP

(57) ABSTRACT

The inexpensive sensor detects a low oil or no oil condition in an internal combustion engine and shuts down the engine. The sensor includes two inductors having different resistances disposed in a sensing bridge. The inductors are heated by a steady low voltage. A periodic higher voltage is applied to the inductors by means of a power winding disposed on the same frame as the ignition coil. When at least one of the inductors is disposed in air and not in oil, an imbalance is created in the sensing circuit that is used to short out the ignition primary. Alternatively, the sensor can be used to provide a visual or audible indication of a low oil level without stopping the engine.

57 Claims, 4 Drawing Sheets

LIQUID LEVEL SENSOR FOR INTERNAL COMBUSTION ENGINE

This is a continuation-in-part of U.S. patent application Ser. No. 09/252,511 filed Feb. 18, 1999, now abandoned.

BACKGROUND OF THE INVENTION

This invention relates to an apparatus which senses the level of a liquid in an internal combustion engine, and more particularly to low oil sensors for such engines.

Many types of liquid level sensors are known for internal combustion engines. One type of sensor is an electromechanical float switch. In a typical float switch, the float rides on the surface of the lubricating fluid, and is electrically connected to the engine ignition primary winding. A second contact is stationary, and is electrically connected to ground. When the lubricating fluid level falls below a predetermined value, the two electrical contacts engage each other, and the ignition primary winding is grounded to shut off the engine.

Such float switches contain several mechanical and electrical components, and are relatively expensive to manufacture, assemble and maintain. Moreover, they tend to be inaccurate in that there is a great deal of turbulence in the engine fluid, causing the float to rise or fall substantially even though the level of the lubricating fluid is adequate.

SUMMARY OF THE INVENTION

A sensor is disclosed that detects a low liquid or a no liquid level condition in an internal combustion engine. The sensor includes a sensing circuit having first and second inductors, with at least one of the inductors partially disposed in air above the liquid level during a low liquid level condition. A first circuit applies a first voltage to the first and second inductors to heat the inductors. A second circuit applies a second voltage, greater than the first voltage, to the first and second inductors. The second voltage is preferably a periodic voltage signal generated by a power winding. The sensor includes a third circuit that senses a voltage difference between a first point and a second point in the sensor, and that provides a control signal when the voltage difference reaches a predetermined value. This control signal may be used to shut off the engine, or to provide a visual or audible indicator that a low liquid level condition exists. Moreover, the sensor can include a voltage-regulating circuit connected to the first and second circuits. The voltage-regulating circuit adjusts the voltage being applied to the sensing circuit such that the applied voltage has a constant root-mean-square value.

The first and second inductors have different resistances so that they heat differently when one of them is at least partially disposed in air. When a low liquid condition exists, the second inductor is at least partially disposed in air. When a no liquid level condition exists, both of the inductors are at least partially disposed in air. Since the inductors have different resistances and heat at different rates, having at least one of the inductors at least partially disposed in air creates an imbalance in the sensing circuit. This imbalance is used to generate an output signal indicative of a low or no liquid level condition.

In each of the embodiments, the power winding is used to provide the necessary power to generate the first voltage and the second voltage. In this way, the inductors may be constantly heated. The first voltage may be generated without the use of a battery, although a battery could be used.

In one embodiment, the second inductor, having a higher resistance and typically a higher inductance, is disposed at a physically higher level in the engine than the first inductor. In alternate embodiments, the positions of the two inductors are reversed or indeed the inductors may be adjacent to each other, depending upon the engine configuration. For example, if the inductors are disposed in a confined space such as a tube with an open bottom, it may be beneficial to place the inductor having the higher resistance near the bottom of the tube so that the liquid will flow over the inductor. The placement of the respective inductors is not critical since the sensor is designed to generate an output signal when at least one of the inductors is disposed in air.

Inductors are preferred over thermistors or other resistors in the present invention because the resistance of a copper wire used with typical inductors changes only about 2 to 1 over the typical engine operating range of −50° to 350° Fahrenheit. The resistance of thermistors changes on the order of 10,000 to 1 for this engine operating range, thereby necessitating expensive, complex circuitry for the sensor. Of course, copper wound resistors could also be used in the present invention in place of the inductors.

It is a feature and advantage of the present invention to use the inherent resistance of inductors in a low liquid level or low oil sensor.

It is another feature and advantage of the present invention to heat the inductors with a low voltage, thereby allowing inductors to be used without the need of a battery.

It is yet another feature and advantage of the present invention to at least periodically apply a higher voltage to the inductors, thereby generating a control signal in the sensing bridge in the event that at least one of the inductors is no longer disposed in liquid.

These and other features and advantages of the present invention will be apparent to those skilled in the art from the following description of the preferred embodiment and the drawing.

DETAILED DESCRIPTION OF THE INVENTION

Figure 1:
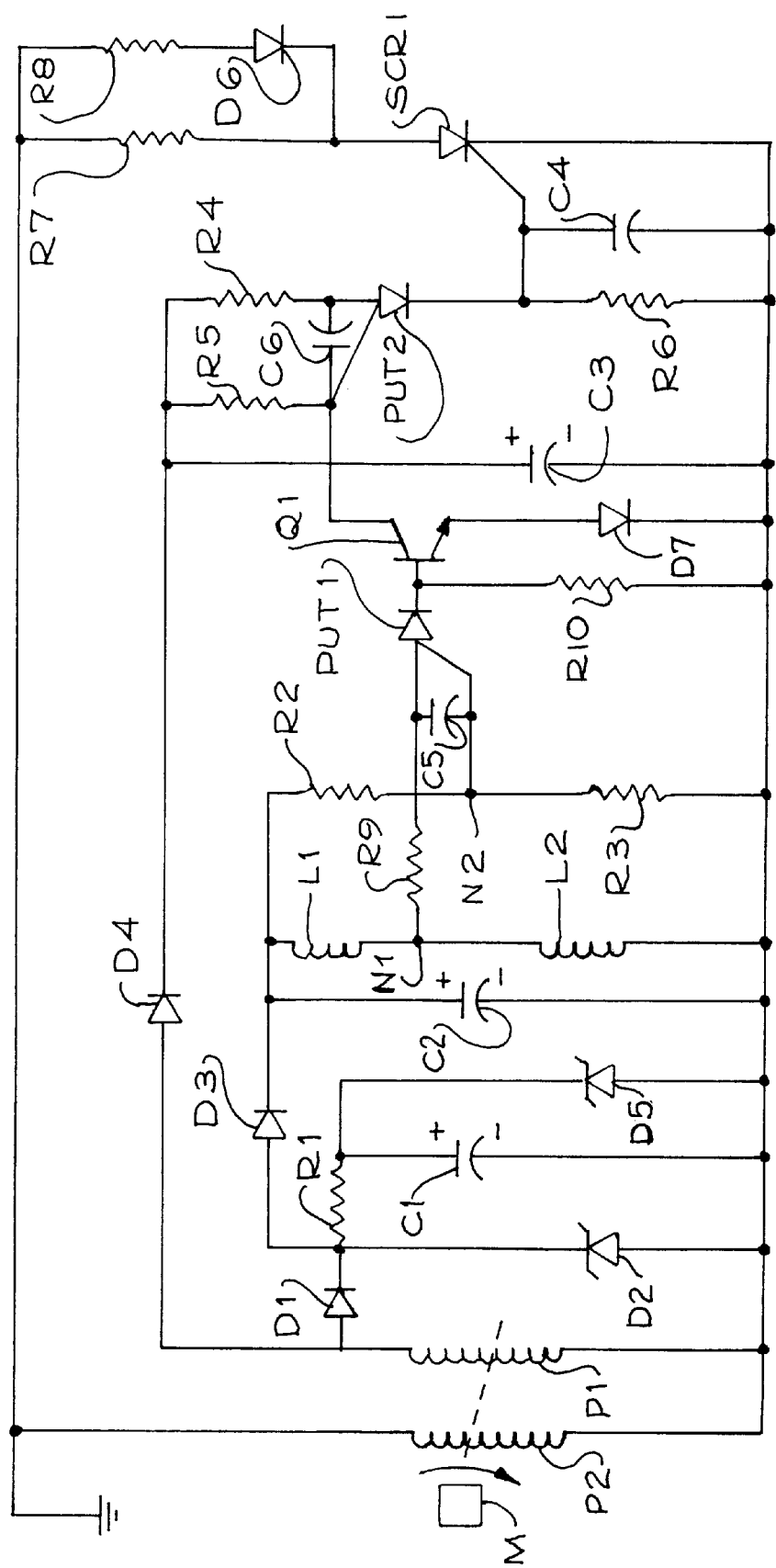
FIG. 1 is a schematic diagram of a sensor and control circuit embodying the invention.

Shown in FIG. 1 is a schematic diagram of a sensor and control circuit embodying the invention. A power winding P1 is disposed on one leg of the engine's ignition coil frame and generates a power winding voltage signal each time flywheel magnet M passes power winding P1. Magnet M is also used to generate a high voltage signal via ignition primary winding P2.

A low voltage generating circuit is used to provide a relatively low first voltage to inductors L1 and L2. The low voltage generating circuit includes power winding P1, diode D1, capacitor C1, resistor R1, and zener diode D5. Power winding P1 charges capacitor C1, and capacitor C1 discharges through resistor R1 to capacitor C2 to apply a relatively low voltage on the order of five to six volts across inductors L1 and L2.

A periodic, relatively high second voltage is applied to inductors L1 and L2 by a second voltage generating circuit comprised of magnet M, power winding P1, diodes D1, D2, and D3, and capacitor C2. This higher voltage signal is generated in the following way. The power winding signal from power winding P1 is rectified by diode D1 and is then limited by zener diode D2. When the voltage is generated, it passes through a rectifier diode D3 to capacitor C2 and then to the sensing bridge circuit configuration of inductors L1 and L2 and resistors R2 and R3.

As the voltage is generated, a higher voltage is applied across the sensing bridge because resistor R1 prevents the low voltage generating circuit from limiting voltage to too low a value.

As a result, during the time that the high voltage is generated, a fairly high voltage on the order of 35 volts or more is applied across the sensing bridge. After this higher voltage is no longer generated (i.e., the flywheel magnet M is no longer in proximity to power winding P1), capacitor C1 discharges through resistor R1 and rectifier D3 through the bridge components in order to maintain a voltage across the bridge and current through the bridge to heat up the inductors L1 and L2.

As long as both of the inductors L1 and L2 are in the liquid (typically a lubricant such as oil), their respective temperatures will stay approximately the same so that their resistance values will retain about the same ratio to each other. The actual resistances may change, but the ratio of the respective resistances will not significantly change. If one of the inductors is disposed in the liquid and the other is disposed in air, one of the inductors will warm up much faster than the other inductor, thereby creating an imbalance in the bridge sensing circuit. This imbalance effectively creates a voltage difference between a point connecting inductor L1 and inductor L2, such as node N1, on the one hand, and a point connecting resistor R2 and resistor R3, such as node N2, on the other hand. This imbalance creates a voltage that is applied across the anode to gate junction of a programmable unijunction transistor PUT1 through resistor R9, thereby switching on PUT1, which in turn switches on transistor Q1. Resistors R2 and R3 set the gate voltage of PUT1. Resistor R10 is optional, and may be used in some configurations to suppress transient voltages and to minimize the adverse effects of component and circuit-board capacitance.

When transistor Q1 is switched ON, it brings the gate of PUT2 to a low voltage while the anode of programmable unijunction transistor PUT2 will remain at a higher voltage. As a result, PUT2 is switched ON, causing capacitor C3 to discharge through PUT2 and the gate to cathode junction of SCRI.

Capacitor C3, when discharged through resistor R4 and through transistor PUT2, switches ON silicon-controlled rectifier SCR1. When switch SCR1 switches ON, primary winding P2 is short circuited, thereby causing the engine to shut down. A visual indicator, comprised of resistors R7 and R8 and a light emitting diode D6, provides a visual indicator to the engine operator that a low oil or no oil condition exists. In the alternative, the visual indicator could be replaced by an audible indicator such as a buzzer, alarm or the like.

Table A below contains the values and part types for components of one embodiment of the invention.

TABLE A

| COMPONENT | VALUE/TYPE |
|---|---|
| C1 | 1000 microfarads, 6.3V |
| C2 | 22 microfarads, 35V |
| C3 | 100 microfarads, 35V |
| C4 | 0.1 microfarads |
| C5 | 0.022 microfarads |
| C6 | 0.1 microfarads |
| D1 | 1N4004 |
| D2 | Vz = 36 volts |
| D3 | 1N4004 |
| D4 | 1N4004 |
| D5 | Vz = 6.2 volts |
| D6 | LED |
| D7 | 1N4004 |
| R1 | 27 ohms |
| R2 | 2.7k ohms |
| R3 | 6.8k ohms |
| R4 | 10k ohms |
| R5 | 100k ohms |
| R6 | 100k ohms |
| R7 | 10 ohms |
| R8 | 100 ohms |
| R9 | 1k ohms |
| R10 (optional) | 10k ohms |
| L1 | R = 27 ohms, L = 330 microhenries |
| L2 | R = 68 ohms, L = 1,000 microhenries |
| SCR1 | EC103D |
| PUT1 | 2N6028 |
| PUT2 | 2N6028 |

It is noted that inductors L1 and L2 are selected such that one of the inductors has a higher resistance and higher inductance than the other. For the circuit shown in FIG. 1, it is preferred that one of the inductors has a resistance of at least 150 percent greater than the other. When a second or higher voltage of typically 30 volts greater than the first voltage is applied to the sensing bridge, and assuming that one inductor has a resistance greater than the other inductor as described above, an imbalance is created in the sensing bridge that is used to indicate a low oil or no oil condition and preferably shut down the engine.

Since the inductors are chosen to have different resistances, it is possible to configure the inductors such that neither inductor is disposed at a higher physical level in the engine housing than the other, or indeed the inductors may be disposed adjacent to each other in the engine housing. Since the inductors have different resistances, they will dissipate heat at different rates when at least one of the inductors is disposed in air. The inductor having a higher resistance will dissipate heat at a higher rate than the other inductor.

In general, it is preferred that the inductor having a higher resistance is disposed physically above the other inductor, so that this inductor will be disposed in the air space above the lubricant level when a low oil condition exits. However, the inductor having the higher resistance could be disposed physically at a lower level than the other inductor, if, for example, the two inductors are placed in a confined area such as a tube, with an opening at the bottom of the tube to allow the lubricant to flow in and out of the tube. In this case, it may be preferred to place the inductor having the higher resistance at a lower level in the engine, to allow the lubricant to more readily flow over this inductor.

Since the invention is designed to shut off the engine when the oil level is below a second, lower predetermined level (corresponding to a substantially no oil condition), it is not crucial which inductor is disposed physically higher than the other. That is, when both inductors are disposed in air and not in lubricant, the invention still shuts off the engine due to the resulting imbalance in the sensing bridge.

Figure 2:
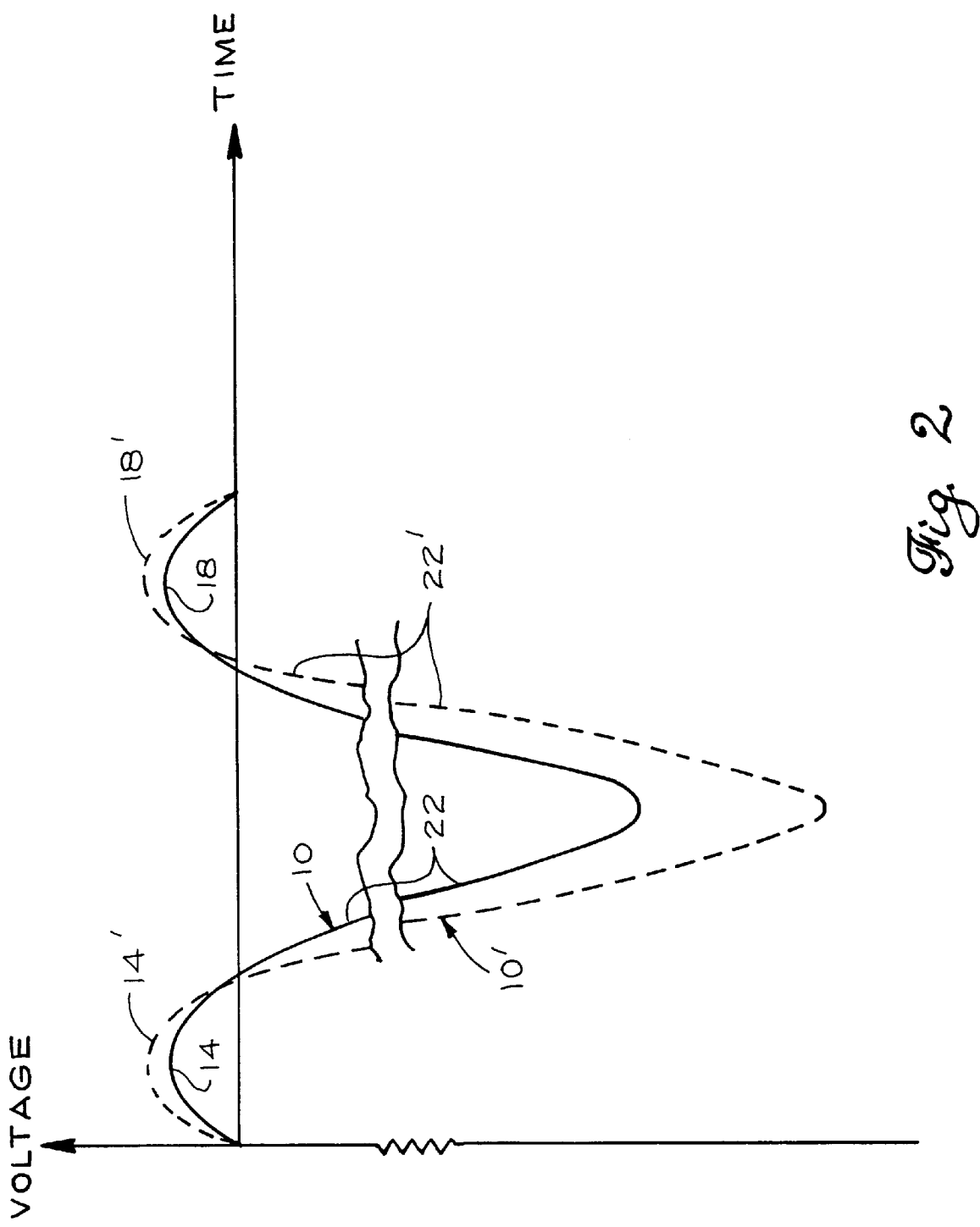
FIG. 2 is a diagram showing two representative voltage waveforms at different engine speeds that are applied to the sensor.

In general terms, the low and high voltage circuits disclosed in FIG. 1 operates as follows. Power winding P1 generates a power winding voltage waveform 10 (FIG. 2) each time magnet M passes power winding P1. Voltage waveform 10 typically has leading and trailing half-cycles 14 and 18 of one polarity and a center half cycle 22 of the opposite polarity. Typically, the center half cycle 22 of waveform 10 has a significantly higher amplitude than the leading and trailing half-cycles 14 and 18.

Figure 3:
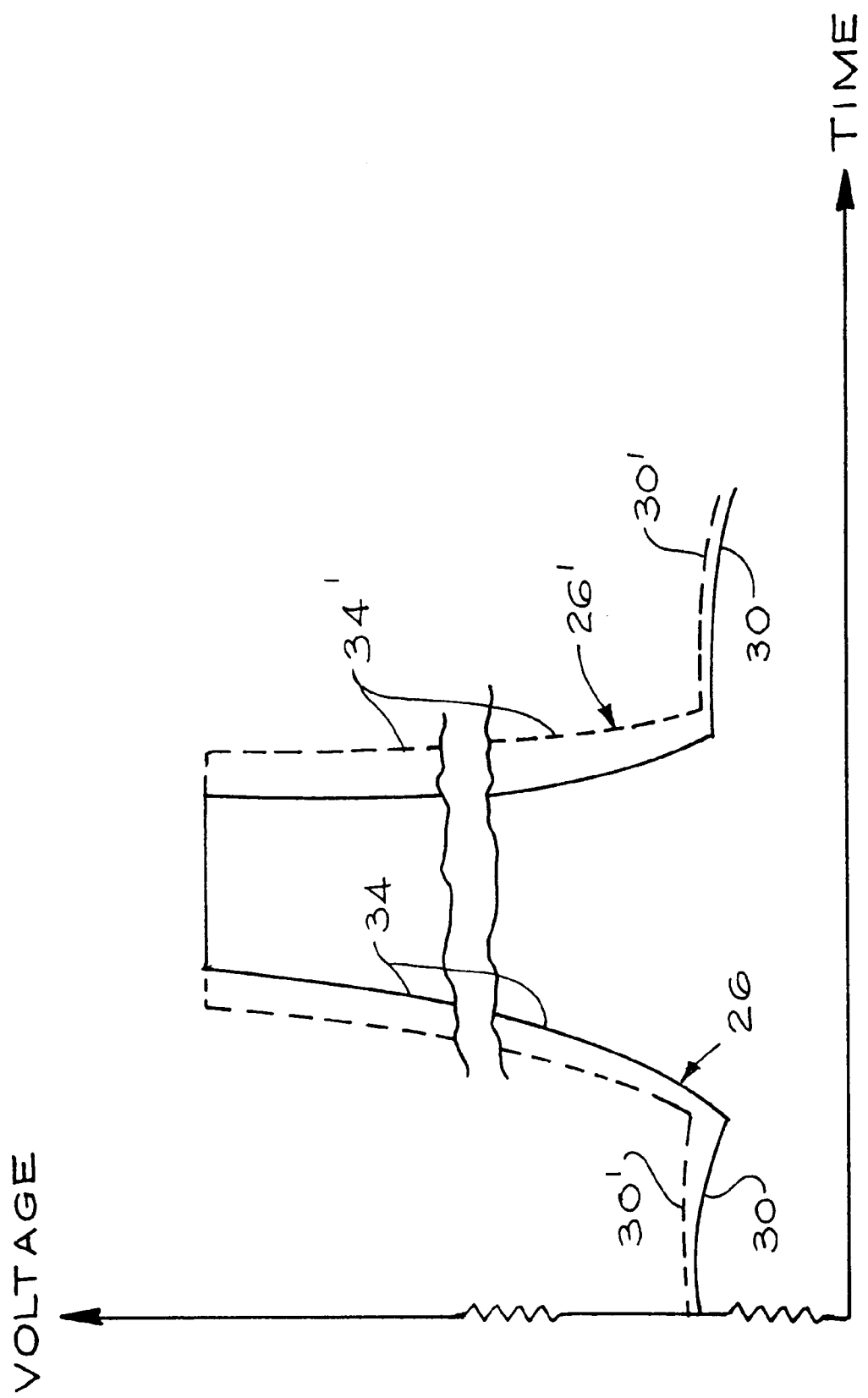
FIG. 3 is a diagram showing two representative voltage waveforms at different engine speeds that are applied to inductors L1 and L2.

As the power winding voltage waveform 10 is applied to the low and high voltage circuits of FIG. 1, a composite voltage waveform 26 (FIG. 3) results. The composite waveform 26 is applied to inductors L1 and L2, which heats inductors L1 and L2. The composite voltage waveform 26 contains a substantially direct current (DC) low voltage component 30 and a substantially periodic high voltage component 34. The low voltage circuit generates the DC component 30 and the high voltage circuit generates the periodic component 34.

The low and high voltage generating circuits described for FIG. i, are preferably used in systems having constant engine speeds. The reason for this is that as magnet M passes power coil P1 at a different rate, a different power winding voltage waveform results (represented as 22' in FIG.2). An increased rate of magnet M causes the center half cycle 22' to increase in magnitude. If the speed of magnet M significantly increases, the center half cycle 22' also significantly increases in amplitude and duty-cycle. Although the amplitude of the voltage of the high voltage circuit is limited by zerier diode D2 (FIG. 1), the duty-cycle of the high voltage signal 34' (FIG. 3) applied to inductors L1 and L2 increases. Therefore, the amount of time the high voltage signal is applied to inductors L1 and L2 increases.

The amount of power applied to inductors L1 and L2 and, thus, how significantly inductors L1 and L2 are heated is proportional to the root-mean-square (RMS) value of the applied composite voltage waveform 26 or 26'. If the RMS value of the composite voltage increases, the amount of power applied to inductors L1 and L2 also increases. Therefore, when the engine speed increases, the RMS value of the composite waveform applied to inductors L1 and L2 also increases. This causes the inductors L1 and L2 to heat at a faster rate and for a longer period of time each time magnet M passes power winding P1. It is the RMS value of the composite waveform that determines the heating value of the waveform.

In order to allow for a wider engine speed range, a voltage-regulating circuit VRC1 (schematically shown in FIG. 4) is added to the low and high voltage circuits. The voltage-regulating circuit VRC1 adjusts the composite voltage applied to the inductors such that the RMS value remains constant. Providing a constant RMS value allows the sensing circuit to give a consistent reading over a larger range of operating speeds. For example, the sensor and control circuit shown in FIG. 4 is preferably used for engines having a 1700–4000 RPM operating range.

Figure 4:
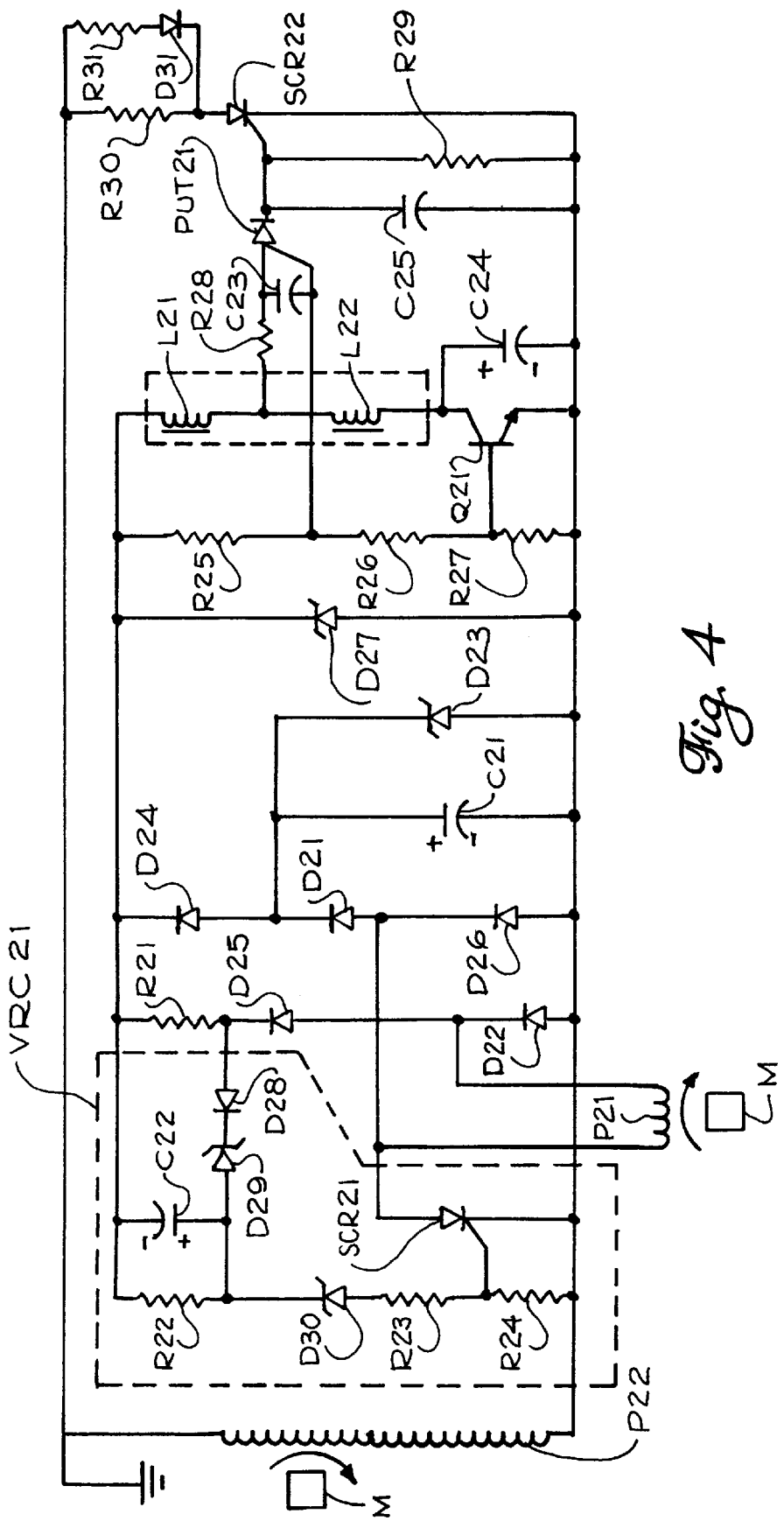
FIG. 4 is a schematic diagram of a second sensor and control circuit embodying the invention.

Shown in FIG. 4 is a second schematic diagram of a sensor and control circuit embodying the invention. Similar to FIG. 1, a power winding P21 is disposed on one leg of the engine's ignition coil frame and generates a power winding voltage signal each time flywheel magnet M passes power winding P21. Magnet M is also used to generate a high voltage signal via ignition primary winding P22.

A low voltage generating circuit is used to provide a relatively low first voltage to inductors L21 and L22. The low voltage generating circuit includes power winding P21, diode D21, D22 and D24, capacitor C21 and zener diode D23. The low voltage signal is generated in the following way. The leading and trailing half-cycles of power-winding voltage charge capacitor C21 through rectifier diode D21. A return path is provided by rectifier diode D22. The capacitor C21 charges rapidly each time magnet M passes power winding P21 and then discharges continuously through rectifier diode D24 into sensing inductors L21 and L22. Zener diode D23 limits the value of the conditioned DC voltage.

A periodic, relatively high second voltage is applied to inductors L21 and L22 by a second voltage generating circuit comprised of magnet M, power winding P21, diodes D25 and D26, resistor R21 and zener diode D27. The high voltage signal is generated in the following way. The center half cycle of power winding voltage is applied to the sensing and control circuitry through rectifier diode D25 and resistor R21. A return path is provided by rectifier diode D26. Zener diode D27 limits the peak amplitude of the center half cycle of the applied waveform. This is done to maintain a relatively constant peak voltage across the system sensing bridge regardless of engine speed.

The low and high voltage generating circuits described thus far for FIG. 4 are similar to the low and high generating circuits described for FIG. 1. That is, the low and high voltage circuits described thus far can be used for engines having a substantially constant motor speed. However, if the engine varies in engine speed, a voltage-regulating circuit can be added.

Shown in FIG. 4 is an exemplary voltage-regulating circuit. At low engine speeds, the composite voltage waveforn is unaffected by voltage-regulating circuitry VRC21. As engine speed increases, however, voltage-regulating circuitry VRC21 begins to function.

The voltage-regulating circuit VRC21 is comprised of resistors R22, R23 and R24, capacitor C22, diode D28, zener diodes D29 and D30, and silicon-controlled rectifier SCR21. The voltage-regulating circuit VRC21 operates in the following way. Each time magnet M passes power winding P21, the high voltage component occurs across resistor R21. As engine speed increases, the voltage across R1 becomes sufficiently high to allow conduction through rectifier diode D28 and zener diode D29. When this occurs, a DC voltage begins to develop across capacitor C22 and resistor R22. As engine speed continues to increase, the amplitude of the DC voltage across capacitor C22 increases and the ripple in the DC voltage decreases. The voltage across capacitor C22, in conjunction with the voltage across inductors L21 and L22, controls the gate of silicon-controlled rectifier SCR21 through zener diode D30, resistor R23 and resistor R24. As the DC voltage across capacitor C22 increases and ripple decreases, SCR21 switches on earlier during the leading and trailing half-cycles of the power winding voltage waveform. As a result, the DC component of the composite waveform is reduced. This helps offset the increased RMS value of the periodic component at increased speeds, and, thus maintaining a nearly constant true RMS voltage for the composite waveform.

One half of the system's sensing bridge for the sensor and control circuit consists of a voltage divider made up of resistors R25 and R26 and the base to emitter voltage drop of transistor Q21. The opposite side of the bridge consists of a voltage divider made up of inductors L21 and L22, and the collector to emitter voltage drop of transistor Q21. The output of the sensing bridge is applied to programmable-unijunction transistor PUT21 through resistor R28 and capacitor C23. When both inductors are immersed in oil, the output of the sensing bridge is too low to switch PUT21 on. If one of the inductors is disposed in the liquid and the other is disposed in air, one of the indicators will warm up much faster than the other, thereby creating an imbalance in the bridge sensing circuit. This imbalance effectively creates a voltage difference between a point connecting inductors L21 and L22 and a point connecting resistors R25 and R26. The voltage difference results in a signal that is applied across the anode-to-gate junction of PUT 21. This results in PUT21 switching on.

After PUT21 switches on, capacitor C21 discharges through rectifier D24, inductor L21, resistor R28, and PUT21 into the gate of silicon-controlled rectifier SCR22. As a result of this action, SCR22 switches on and the engine's ignition coil primary winding voltage is shunted to ground, thus stopping the engine. SCR22 will begin to conduct as long as an adequate gating signal is provided by capacitor C21. When switch SCR22 switches ON, primary winding P22 is short circuited, thereby causing the engine to shut down. A visual indicator, comprised of resistors R30 and R31 and a light emitting diode D31, provides a visual indicator to the engine operator that a low liquid or no liquid condition exists. In the alternative, the visual indicator could be replaced by an audible indicator such as a buzzer, alarm or the like.

In the circuit shown in FIG. 4, capacitor C25 and resistor R29 are used to minimize the effects of electrical noise on SCR22. Without these components, rapid changes in the anode-to-cathode voltage of SCR22 could result in SCR22 switching on at times other than those desired.

Moreover, transistor Q21 prevents capacitor C21 from discharging rapidly through the system's sensing inductors after a signal switches PUT21 on. Throughout normal system operation, transistor Q21 conducts allowing the sensing inductors L21 and L22 to heat up due to the power applied to them. When PUT21 switches on, however, the voltage applied to the base-emitterjunction of transistor Q21 is shunted by the conducting gate-to-cathode junctions of PUT21 and SCR22. As a result of this, transistor Q21 switches off and remains off as long as capacitor C21 continues to discharge through PUT21. The use of transistor Q21 in combination with PUT21 reduces the number of components shown in FIG. 1 required to sense the signal of the sensing bridge and to shut down the engine. Transistor Q21 prevents a path through inductors L21 and L22 thereby enabling SCR22 to remain on long enough to shut down the engine. Capacitor C24 is used to prevent switching transients from adversely affecting system performance.

Table B below contains the value and parts for components for the invention embodied in FIG. 4.

TABLE B

| Component | Value/Type |
| --- | --- |
| D21 | 1N5819 |
| D22 | 1N5819 |
| D23 | Vz = 6.2 volts |
| D24 | 1N5819 |
| D25 | 1N4004 |
| D26 | 1N4004 |
| D27 | Vz = 30 volts |
| D28 | 1N4004 |

TABLE B-continued

| Component | Value/Type |
| --- | --- |
| D29 | Vz = 5.6 volts |
| D30 | Vz = 5.6 volts |
| D31 | LED |
| R21 | 18 ohms |
| R22 | 2.2K ohms |
| R23 | 1K ohms |
| R24 | 1K ohms |
| R25 | Selected |
| R26 | 10K ohms |
| R27 | 10K ohms |
| R28 | 2.7K ohms |
| R29 | 10K ohms |
| R30 | 10 ohms |
| R31 | 100 ohms |
| C21 | 3300 microfarads, 6.3 volt |
| C22 | 100 microfarads, 35 volt |
| C23 | 0.022 microfarads, 50 volt |
| C24 | 2.2 microfarads, 50 volt |
| C25 | 0.1 microfarads, 50 volt |
| SCR21 | EC103D |
| SCR22 | EC103D |
| PUT21 | 2N6028 |
| Q21 | ZTX690B |
| L21 | R = 18 ohms, L = 1200 microhenries |
| L22 | R = 50 ohms, L = 1000 microhenries |

While several embodiments of the present invention have been described, other embodiments will be apparent to those skilled in the art and are within the attending scope of the present invention. Therefore, the invention is limited only by the following claims:

We claim:

1. A sensor that detects a low liquid level condition in an engine, comprising:
    a sensing circuit, including
        a first inductor that is at least partially disposed in air during a low liquid level conditions;
        a second inductor connected in series with said first inductor at a first point;
        a first resistor;
        a second resistor connected in series with said first resistor at a second point;
    a first circuit that applies a first voltage to said first and second inductors;
    a second circuit that applies a second voltage, greater than said first voltage, to said first and second inductors; and
    a third circuit that senses a voltage difference between said first point and said second point that indicates an imbalance in the sensing circuit, and that provides a signal indicative of a low liquid level when the voltage difference reaches a predetermined value.

2. The sensor of claim 1, wherein said sensing circuit further includes a third resistor that reduces electrical noise.

3. The sensor of claim 1, wherein the engine includes an ignition coil primary winding, said sensor further comprising a fourth circuit that short circuits the ignition coil primary winding to shut off the engine in response to said signal.

4. The sensor of claim 1, further comprising:
    a visual indicator that a low liquid level exists.

5. The sensor of claim 1, further comprising:
    an audible indicator that a low liquid level exists.

6. The sensor of claim 1, wherein said first circuit includes a voltage source, a third resistor, and a capacitor, wherein said voltage source is connected in circuit to charge said capacitor with a charging voltage, and wherein said capacitor is connected in circuit to discharge through said third resistor to provide said first voltage.

7. The sensor of claim 6, wherein said first circuit further includes a diode and a zener diode, wherein said diode is connected in circuit to rectify the charging voltage supplied by said voltage source, and wherein said zener diode is connected in circuit to limit the charging voltage.

8. The sensor of claim 7, wherein the engine includes a flywheel magnet, and wherein said voltage source includes a power winding that generates a winding voltage when the flywheel magnet passes said power winding.

9. The sensor of claim 1, wherein the engine includes a flywheel magnet, and wherein said second circuit also includes a capacitor and a power winding, said power winding generating a charging voltage when the flywheel magnet passes said power winding to thereby charge said capacitor.

10. The sensor of claim 1, wherein said first inductor and said second inductor have different respective resistances.

11. The sensor of claim 10, wherein said respective resistances differ by at least 150 percent.

12. The sensor of claim 10, wherein said second inductor has a higher resistance than said first inductor.

13. The sensor of claim 1, wherein said first inductor and said second inductor have different respective inductances.

14. The sensor of claim 13, wherein the respective inductances differ by at least 150 percent.

15. The sensor of claim 13, wherein said second inductor has a larger inductance than said first inductor.

16. The sensor of claim 1, wherein said third circuit includes a programmable unijunction transistor, and wherein said signal switches ON said programmable unijunction transistor when said predetermined value is reached.

17. The sensor of claim 1, wherein said first voltage is between 5 and 6 volts.

18. The sensor of claim 1, wherein said second voltage is at least 30 volts greater than said first voltage.

19. The sensor of claim 1, wherein said second inductor is disposed physically at a higher level in said engine than said first inductor.

20. The sensor of claim 1, wherein said first and second inductors are disposed substantially adjacent to each other in said engine.

21. The sensor of claim 1, wherein said first circuit includes a voltage source, a capacitor and a diode, wherein said voltage source is connected in circuit to charge said capacitor with a charging voltage, and wherein said capacitor is connected in circuit to discharge through said diode to provide said first voltage.

22. The sensor of claim 1, wherein said third circuit includes:
   a third resistor electrically connected to said second resistor at a first node;
   a transistor having a base, an emitter and a collector, said base is electrically connected to said third resistor at said first node and said emitter is electrically connected to said second inductor at a second node; and
   a capacitor electrically connected to said transistor at said second node.

23. The sensor of claim 1, wherein said third circuit includes a transistor and a programmable injunction transistor (PUT) connected in circuit, wherein said signal switches ON said PUT, and wherein turning ON said PUT turns OFF said transistor.

24. The sensor of claim 1, wherein said first and second voltages being applied to said inductors results in a composite voltage, wherein said composite voltage has a root-mean-square (RMS) value, and said sensor further comprises:
   a voltage regulating circuit that adjusts said composite voltage such that the RMS value of said composite voltage remains substantially constant.

25. The sensor of claim 24, wherein said voltage regulating circuit adjusts said first voltage such that said RMS value of said composite voltage remains substantially constant.

26. The sensor of claim 25, wherein said voltage regulating circuit decreases said first voltage.

27. The sensor of claim 1, wherein said second circuit includes a voltage source, a diode and a third resistor connected in circuit to provide said second voltage.

28. The sensor of claim 27, wherein said second voltage has a peak amplitude, and wherein said second circuit includes a voltage limiting device connected in circuit to limit said peak amplitude of said second voltage.

29. The sensor of claim 27, wherein a third voltage develops across said third resistor, wherein said first and second voltages being applied to said inductors results in a composite voltage, and wherein said sensor further comprises:
   a voltage regulating circuit that adjusts said composite voltage to said inductors, said voltage regulating circuit includes a capacitor, a diode, a voltage limiting device, and a silicon-controlled rectifier (SCR), said capacitor is connected in circuit and charges when a sufficient voltage develops across said third resistor allowing current flow through said diode and said voltage limiting device, and said SCR is connected in circuit to be controlled by said capacitor and said composite voltage.

30. The sensor of claim 29, wherein said first voltage has an amplitude, and wherein said amplitude of said first voltage decreases when said SCR switches on.

31. The sensor of claim 1, wherein said second voltage is a periodic signal.

32. The sensor of claim 31, wherein the engine includes a flywheel and a magnet, and wherein said periodic signal is generated using said flywheel and said magnet.

33. A method of measuring a low liquid level condition in an engine, the method comprising;
   providing a predetermined value;
   providing a sensing circuit including a first inductor that is at least partially disposed in air during a low liquid level condition, a second inductor connected in series to said first inductor at a first node, a first resistor, and a second resistor connected in series to said first resistor at a second node;
   applying a first voltage to said sensing circuit;
   applying a second voltage to said sensing circuit, said second voltage being greater than said first voltage;
   sensing a voltage difference between said first and second nodes that indicates an imbalance in the sensing circuit; and
   generating a signal indicative of a low liquid level when said voltage difference reaches said predetermined value.

34. A method as set forth in claim 33, further comprising:
   providing a first circuit electrically connected to said sensing circuit;
   providing a second circuit electrically connected to said sensing circuit;

generating said first voltage in said first circuit; and generating said second voltage in said second circuit.

35. A method as set forth in claim 34, wherein said steps of applying said first and second voltages to said sensing circuit result in a composite voltage having a root-mean-square (RMS) value, the method further comprising:

providing a voltage regulating circuit electrically connected to said first and second circuits; and adjusting said composite voltage such that said RMS value remains substantially constant.

36. A method as set forth in claim 35, wherein said adjusting step comprises:

reducing said first voltage such that said RMS value of said composite voltage remains substantially constant.

37. A method as set forth in claim 33, wherein the engine includes an ignition coil primary winding that generates a supply voltage to the engine and wherein the supply voltage assists the engine in generating power, the method further comprising:

preventing the supply voltage from assisting the engine to generate power when said signal is generated.

38. A method as set forth in claim 37, wherein said preventing step comprises:

short circuiting said ignition coil primary winding to shut off said engine.

39. A method as set forth in claim 33, further comprising:

providing a visual indication that low liquid level exists when said signal is generated.

40. A method a set forth in claim 33, further comprising:

providing an audible indication that low liquid level exists when said signal is generated.

41. A sensor that detects a low liquid level condition in an engine, the engine including an ignition coil primary winding, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors;

a third circuit that senses a voltage difference between a first point and a second point that indicates an imbalance in the sensing circuit, and that provides a signal indicative of a low liquid level when the voltage difference reaches a predetermined value; and a fourth circuit that short circuits the ignition coil primary winding to shut off the engine in response to said signal.

42. The sensor of claim 41, wherein said second voltage is a periodic signal.

43. The sensor of claim 42, wherein the engine includes a flywheel and a magnet, and wherein said periodic signal is generated using said flywheel and said magnet.

44. A sensor that detects a low liquid level condition in an engine, the engine including a flywheel magnet, comprising:

a sensing circuit, including a first inductor that is at least partially disposed in air during a low liquid level condition, and including a second inductor;

a first circuit that applies a first voltage to said first and second inductors, including a voltage source, including a power winding that generates a winding voltage when the flywheel magnet passes said power winding;

a resistor;

a capacitor, wherein the voltage source is connected in circuit to charge said capacitor with a charging voltage, and wherein said capacitor is connected in circuit to discharge through said resistor to provide said first voltage;

a diode;

a zener diode, wherein said diode is connected in circuit to rectify the charging voltage supplied by said voltage source, and wherein said zener diode is connected in circuit to limit the charging voltage;

a second circuit that applies a second voltage, greater than said first voltage, to said first and second inductors; and a third circuit that senses a voltage difference between a first point and a second point that indicates an imbalance in the sensing circuit, and that provides a signal indicative of a low liquid level when the voltage difference reaches a predetermined value.

45. A sensor that detects a low liquid level condition in an engine, the engine including a flywheel magnet, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors, including a capacitor;

a power winding that generates a charging voltage when the flywheel magnet passes said power winding to thereby charge said capacitor; and a third circuit that senses a voltage difference between a first point and a second point that indicates an imbalance in the sensing circuit, and that provides a signal indicative of a low liquid level when the voltage difference reaches a predetermined value.

46. A sensor that detects a low liquid level condition in an engine, comprising:

a sensing circuit, including a first inductor that is at least partially disposed in air during a low liquid level condition, and including a second inductor that is physically disposed at a higher level in said engine than said first inductor;

a first circuit that applies a first voltage to said first and second inductors;

a second circuit that applies a second voltage, greater than said first voltage, to said first and second inductors; and a third circuit that senses a voltage difference between a first point and a second point that indicates an imbalance in the sensing circuit, and that provides a signal indicative of a low liquid level when the voltage difference reaches a predetermined value.

47. A sensor that detects a low liquid level condition in an engine, comprising:

a sensing circuit, including a first inductor that is at least partially disposed in air during a low liquid level condition, and including a second inductor electrically connected to said first inductor;

a first resistor;

a second resistor electrically connected to said first resistor;

a first circuit that applies a first voltage to said first and second inductors;

a second circuit that applies a second voltage, greater than said first voltage, to said first and second inductors; and a third circuit that senses a voltage difference between a first point and a second point that indicates an imbalance in the sensing circuit, and that provides a signal indicative of a low liquid level when the voltage difference reaches a predetermined value, wherein said third circuit includes a third resistor electrically connected to said second resistor at a first node;

a transistor having a base, an emitter and a collector, wherein said base is electrically connected to said third resistor at said first node and said emitter is electrically connected to said second inductor at a second node; and a capacitor electrically connected to said transistor at said second node.

48. A sensor that detects a low liquid level condition in an engine, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors; and a third circuit that senses a voltage difference between a first point and a second point that indicates an imbalance in the sensing circuit, and that provides a signal indicative of a low liquid level when the voltage difference reaches a predetermined value, said third circuit including a first transistor; and a programmable unijunction transistor (PUT) connected in circuit to said first transistor, wherein said signal switches ON said PUT, and wherein turning ON said PUT turns OFF said transistor.

49. A sensor that detects a low liquid level condition in an engine, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors, wherein the application of said first and second voltages to said first and second inductors results in a composite voltage having a root-mean-square (RMS) value;

a voltage regulating circuit that adjusts the composite voltage such that the RMS value remains substantially constant; and a third circuit that senses a voltage difference between a first point and a second point that indicates an imbalance in the sensing circuit, and that provides a signal indicative of a low liquid level when the voltage difference reaches a predetermined value.

50. The sensor of claim 49, wherein said voltage regulating circuit adjusts said first voltage such that said RMS value remains substantially constant.

51. The sensor of claim 50, wherein said voltage regulating circuit decreases said first voltage.

52. A sensor that detects a low liquid level condition in an engine, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors, said second circuit including a voltage source, a diode and a resistor connected in circuit to provide said second voltage, said second voltage having a peak amplitude;

a voltage limiting device connected in circuit to limit said peak amplitude of said second voltage; and a third circuit that senses a voltage difference between a first point and a second point that indicates an imbalance in the sensing circuit, and that provides a signal indicative of a low liquid level when the voltage difference reaches a predetermined value.

53. A sensor that detects a low liquid level condition in an engine, comprising:

a sensing circuit, including a first inductor that is at least partially disposed in air during a low liquid level condition, and including a second inductor;

a first circuit that applies a first voltage to said first and second inductors;

a second circuit that applies a second voltage, greater than said first voltage, to said first and second inductors to yield a composite voltage, said second circuit including a voltage source, a first diode, and a resistor connected in circuit to provide said second voltage, wherein a third voltage is developed across said resistor;

a voltage regulating circuit that adjusts said composite voltage to said inductors, said voltage regulating circuit includes a capacitor, a second diode, a voltage limiting device, and a silicon-controlled rectifier (SCR), wherein said capacitor is connected in circuit and charges when a sufficient voltage develops across said resistor allowing current flow through said second diode and said voltage limiting device, and wherein said SCR is connected in circuit to be controlled by said capacitor and said composite voltage; and a third circuit that senses a voltage difference between a first point and a second point that indicates an imbalance in the sensing circuit, and that provides a signal indicative of a low liquid level when the voltage difference reaches a predetermined value.

54. The sensor of claim 53, wherein said first voltage has an amplitude, and wherein said amplitude of said first voltage decreases when said SCR switches on.

55. A method of measuring a low liquid level condition in an engine, the method comprising;

providing a predetermined value;

providing a sensing circuit including a first node, a second node, a first inductor that is at least partially disposed in air during a low liquid level condition and a second inductor;

providing a first circuit electrically connected to said sensing circuit;

generating a first voltage in said first circuit;

applying said first voltage to said sensing circuit;

providing a second circuit electrically connected to said sensing circuit;

generating a second voltage in said second circuit;

applying a second voltage to said sensing circuit, said second voltage being greater than said first voltage;

wherein said first and second voltage applying steps results in a composite voltage having a root-mean-square (RMS) value;

providing a voltage regulating circuit electrically connected to said first and second circuits;

adjusting said composite voltage such that said RMS value remains substantially constant;

sensing a voltage difference between said first and second nodes that indicates an imbalance in the sensing circuit; and generating a signal indicative of a low liquid level when said voltage difference reaches said predetermined value.

56. The method of claim 55, wherein said adjusting step comprises:

reducing said first voltage such that said RMS value remains substantially constant.

57. A method of measuring a low liquid level condition in an engine, the engine including an ignition coil primary winding that generates a supply voltage to the engine so that the supply voltage assists the engine in generating power, the method comprising;

providing a predetermined value;

providing a sensing circuit including a first node, a second node, a first inductor that is at least partially disposed in air during a low liquid level condition, and a second inductor;

applying a first voltage to said sensing circuit;

applying a second voltage to said sensing circuit, said second voltage being greater than said first voltage;

sensing a voltage difference between said first and second nodes that indicates an imbalance in the sensing circuit;

generating a signal indicative of a low liquid level when said voltage difference reaches said predetermined value; and short circuiting the ignition coil primary winding to shut off the engine.

* * * * *